(12) United States Patent
Sprouse et al.

(10) Patent No.: US 7,717,046 B2
(45) Date of Patent: May 18, 2010

(54) HIGH PRESSURE DRY COAL SLURRY EXTRUSION PUMP

(75) Inventors: Kenneth M Sprouse, Northridge, CA (US); David R Matthews, Simi Valley, CA (US)

(73) Assignee: Pratt & Whitney Rocketdyne, Inc., Canoga Park, CA (US)

( * ) Notice: Subject to any disclaimer, the term of this patent is extended or adjusted under 35 U.S.C. 154(b) by 1079 days.

(21) Appl. No.: 11/118,996

(22) Filed: Apr. 29, 2005

(65) Prior Publication Data
US 2006/0243583 A1 Nov. 2, 2006

(51) Int. Cl.
F23K 3/00 (2006.01)

(52) U.S. Cl. ............... 110/101 R; 110/106; 110/232

(58) Field of Classification Search ......... 110/101 R, 110/106, 118, 104 B, 218, 232, 229, 347, 110/293, 315, 342; 201/5–8; 202/262; 418/166; 100/67, 327, 151, 152, 153, 154, 176, 161, 100/47
See application file for complete search history.

(56) References Cited

U.S. PATENT DOCUMENTS

| 2,675,304 | A | * | 4/1954 | Komarek | 44/596 |
| 2,826,986 | A | * | 3/1958 | Weiss | 100/154 |
| 3,504,621 | A | * | 4/1970 | Qualheim | 100/96 |
| 3,856,658 | A | | 12/1974 | Wolk et al. | |
| 4,111,665 | A | | 9/1978 | Pasternak et al. | |
| 4,191,500 | A | | 3/1980 | Oberg et al. | |
| 4,197,092 | A | | 4/1980 | Bretz | |
| 4,206,610 | A | | 6/1980 | Santhanam | |
| 4,206,713 | A | * | 6/1980 | Ryason | 110/347 |
| 4,356,078 | A | | 10/1982 | Heavin et al. | |
| 4,377,356 | A | | 3/1983 | Santhanam | |
| 4,391,561 | A | | 7/1983 | Smith et al. | |
| 4,488,838 | A | | 12/1984 | Herud | |
| 4,721,420 | A | * | 1/1988 | Santhanam et al. | 406/197 |
| 5,558,473 | A | | 9/1996 | Lindahl | |
| 6,152,668 | A | | 11/2000 | Knoch | |
| 6,171,629 | B1 | * | 1/2001 | Morikawa | 426/502 |
| 6,220,790 | B1 | | 4/2001 | Schenk et al. | |

FOREIGN PATENT DOCUMENTS

EP 0 065 459 11/1982

(Continued)

OTHER PUBLICATIONS

U.S. Appl. No. 10/677,817, filed Oct. 2, 2003, Kenneth M. Sprouse et al.

(Continued)

Primary Examiner—Kenneth B Rinehart
(74) Attorney, Agent, or Firm—Carlson, Gaskey & Olds PC

(57) ABSTRACT

A system for providing highly pressurized raw fuel to a pressure reactor. The system includes an inlet for receiving the raw fuel and a roller system communicating with the inlet. The roller system includes a plurality of independent rollers arranged in two converging planes. The rollers of the roller system successively compress the raw fuel as the raw fuel passes through the roller system between the rollers, such that the fuel is highly pressurized when it reaches an output end of the roller system. An outlet is located adjacent the output end of the roller system to dispense the pressurized raw fuel to the pressure reactor.

29 Claims, 3 Drawing Sheets

FOREIGN PATENT DOCUMENTS

WO    WO 2004/015268    2/2004

OTHER PUBLICATIONS

U.S. Appl. No. 10/271,950, filed Oct. 15, 2002, Kenneth M. Sprouse et al.

K. M. Sprouse and M. D. Schuman, Dense-Phase Feeding of Pulverized Coal in Uniform Plug Flow, Nov. 1983, pp. 1000-1006 and reference page.

PCT International Search Report and Written Opinion for International Application No. PCT/US2006/010707 mailed Sep. 5, 2006.

\* cited by examiner

HIGH PRESSURE DRY COAL SLURRY EXTRUSION PUMP

CROSS-REFERENCE TO RELATED APPLICATIONS

The present application is related in general subject matter to U.S. Patent Application Publication No. 2004/0071618, entitled "Method and Apparatus for Continuously Feeding and Pressurizing a Solid Material into a High Pressure System," filed Oct. 15, 2003, assigned to The Boeing Company, and hereby incorporated by reference into the present application. The subject matter of the present application is also related to U.S. patent application Ser. No. 10/677,817, entitled "Regeneratively Cooled Synthesis Gas Generator," filed Oct. 2, 2003, presently allowed, the disclosure of which is also hereby incorporated by reference. Additionally, the subject matter of the present invention is related to U.S. patent application Ser. No. 11/081,144, entitled "Compact High Efficiency Gasifier," filed Mar. 16, 2005. Finally, the subject matter of the present application is related to U.S. patent application Ser. No. 11/117,911, entitled "Advanced Coal Gasification Injector," filed concurrently herewith, the disclosure of which is also hereby incorporated by reference into the present application.

FIELD OF THE INVENTION

The present invention relates to gasification systems, and more particularly to a high pressure dry coal slurry extrusion pump.

BACKGROUND OF THE INVENTION

Various methods may be employed to generate electrical energy, and these methods typically require a high pressure coal supply system. In particular, many of these high pressure systems include high pressure reactors which combust the coal to produce heat or to further refine the carbon from the coal. The high pressure is used to nearly instantaneously combust the coal to produce the desired energy release. Coal, even when highly pulverized, is substantially a solid material and difficult to pressurize to the high pressures needed for combustion. To assist in providing the coal and achieving the high pressures required for combustion thereof, the coal is often formed into a water slurry. The slurry then can be more easily pumped and pressurized to the required high pressures. Generally, it is desired to have the coal pressurized to at least 1000 psi.

Various systems have been developed to provide the high pressure coal required, but these systems all have numerous inefficiencies. With such systems, coal is generally first placed into a slurry of some form. The slurry includes an incompressible liquid, such as water, with the coal particles suspended therein. The carrier fluid of the slurry is also provided to the reactor as a large surplus in the slurry, thereby decreasing the efficiency of the reactor.

Still other systems have attempted to provide a feeder system which uses a screw feeder or pump, but has similar disadvantages. In particular, they generally require a plurality of heat exchangers around the feeder itself to provide the proper temperature of the carbon dioxide ($CO_2$) that is fed into the coal in the feeder. These rely upon high velocity inertia and the incompressibility characteristics of $CO_2$ pumped into the feeder to provide a seal to stop the backflow of the material as it goes from the low pressure input to the high pressure output. These systems do not easily overcome the high pressure head against which the coal is pumped. Finally, there are compressible gas systems that use cycling lock hoppers or sliding cylinders and pistons (see, e.g., Conspray Dynamic Sleeve Piston Coal Feeder, Report No. DOE/MC/14603-1562, Technical Information Center, Springfield, Va. 1984) for pumping pulverized solids to high pressure within a compressible medium. Like those which use incompressible fluids (i.e., water and carbon dioxide, CO2), these later pumps are also very complex and costly.

Accordingly, it is desirable to provide a more efficient less complex system to provide a continuous feed of high pressure coal to a gasification system.

SUMMARY OF THE INVENTION

The present invention provides a system for providing highly pressurized raw fuel to a pressure reactor within a compressible transport fluid medium. In one preferred embodiment, the system includes an inlet operable to receive the raw fuel and a roller system coupled to the inlet. The roller system is operable to pressurize the raw fuel, and includes a first motive roller adjacent to the inlet. The first motive roller is operable to apply a first force to the raw fuel. The roller system further includes a second motive roller adjacent to the inlet and displaced a first distance across from the first motive roller. The second motive roller is operable to apply a second force to the raw fuel. An outlet is adjacent to the roller system, and the outlet dispenses the raw fuel at a high pressure to the pressure reactor.

In another preferred embodiment, the present invention provides a system for pressurizing a raw fuel comprising a vessel operable to receive the raw fuel, and an extruder pump fluidly coupled to the vessel. The extruder pump pressurizes the raw fuel. A discharge tank is fluidly coupled to the extruder pump and is operable to receive the pressurized fluid from the extruder pump. The extruder pump includes a roller system comprising a plurality of motive rollers operable to pressurize the raw fuel.

In another preferred form, the present invention further provides a system for pressurizing a raw fuel including a vessel operable to receive the raw fuel. An extruder pump is fluidly coupled to the vessel, and the extruder pump is operable to pressurize the raw fuel. The extruder pump further includes a housing symmetric to a generally vertical plane comprising an inlet for receipt of the raw fuel from the vessel and an outlet fluidly coupled to the discharge tank to provide the discharge tank with the pressurized raw fuel. The extruder pump further comprises a plurality of motive rollers disposed within the housing, and the plurality of motive rollers are arranged in the housing to form an angle non-parallel to the vertical plane. A discharge tank is fluidly coupled to the extruder pump and is operable to receive the pressurized fluid from the extruder pump. A gasifier is coupled to the discharge tank and is operable to deliver the pressurized raw fuel to a downstream gasifier or combustor.

The features, functions, and advantages can be achieved independently in various embodiments of the present inventions or may be combined in yet other embodiments.

BRIEF DESCRIPTION OF THE DRAWINGS

The present invention will become more fully understood from the detailed description and the accompanying drawings, wherein.

DETAILED DESCRIPTION OF THE VARIOUS EMBODIMENTS

The following description of the various embodiments is merely exemplary in nature and is in no way intended to limit the invention, its application, or uses. Although the following description is related generally to a high pressure dry coal slurry extrusion pump for use in a gasification system, it will be understood that this apparatus could be employed in any appropriate application. Therefore, it will be understood that the following discussion is not intended to limit the scope of the appended claims.

Figure 1:
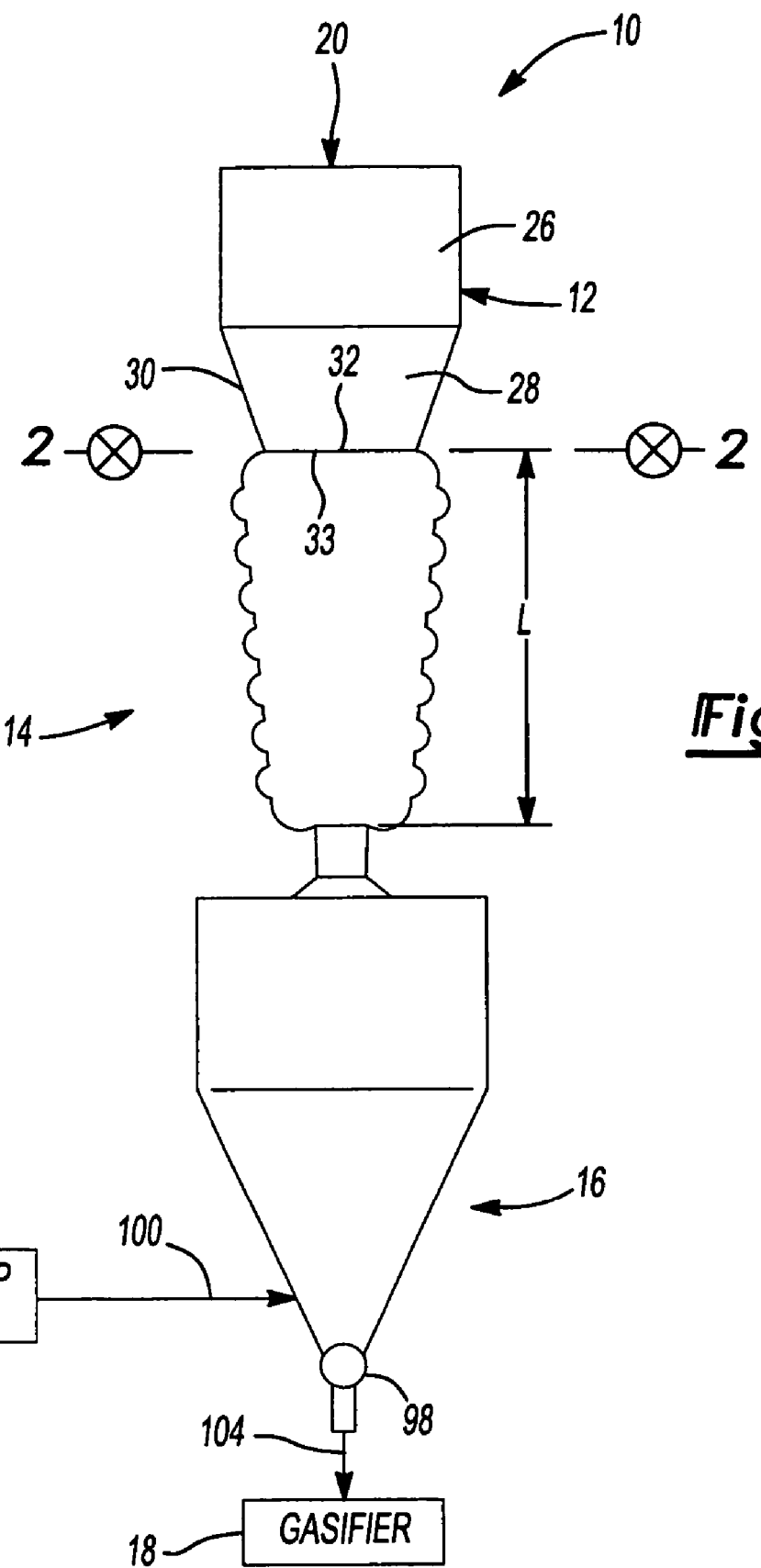
FIG. 1 is a schematic view of a system comprising a high pressure dry coal slurry extrusion pump according to the principles of the present invention.

With reference to FIG. 1, an exemplary gasification pumping system 10 is shown. The gasification pumping system 10 may include a storage vessel 12 fluidly coupled to an extruder pump 14 to provide a raw fuel 8 to the extruder pump 14. The raw fuel 8 may be any appropriate material, such as coal, petcoke, or other carbon based materials which are suitable to be compressed by the extruder pump 14. The extruder pump 14 may be fluidly coupled to a discharge tank 16 which is operable to receive a high pressure raw fuel 8' from the extruder pump 14. The discharge tank 16 may be fluidly coupled to a gasifier 18 to provide the gasifier 18 with the high pressure raw fuel 8'.

The storage vessel 12 may include an inlet 20 and an outlet 32 coupled to the extruder pump 14. The inlet 20 is operable to receive the raw fuel 8 which may be fed into the inlet 20 through a variety of mechanisms, such as a conveyor system (not shown). The storage vessel 12 includes a top section 26 coupled to a bottom section 28. The top section 26 is configured to enable the storage of a large quantity of raw fuel 8, and may generally be circular in shape. The bottom section 28 generally includes a funnel-like shape having a sloped sidewall 30 and the outlet 32. The sloped sidewall 30 facilitates the flow of the raw fuel 8 into the outlet 32. A mesh screen 31 may be positioned within the outlet 32 to ensure that only pieces of raw fuel 8 having a maximum predetermined particle size enters the extruder pump 14. Typically, the storage vessel 12 is positioned above the extruder pump 14 to enable a gravity flow of the raw fuel 8 into the extruder pump 14 from the outlet 32.

Figure 2:
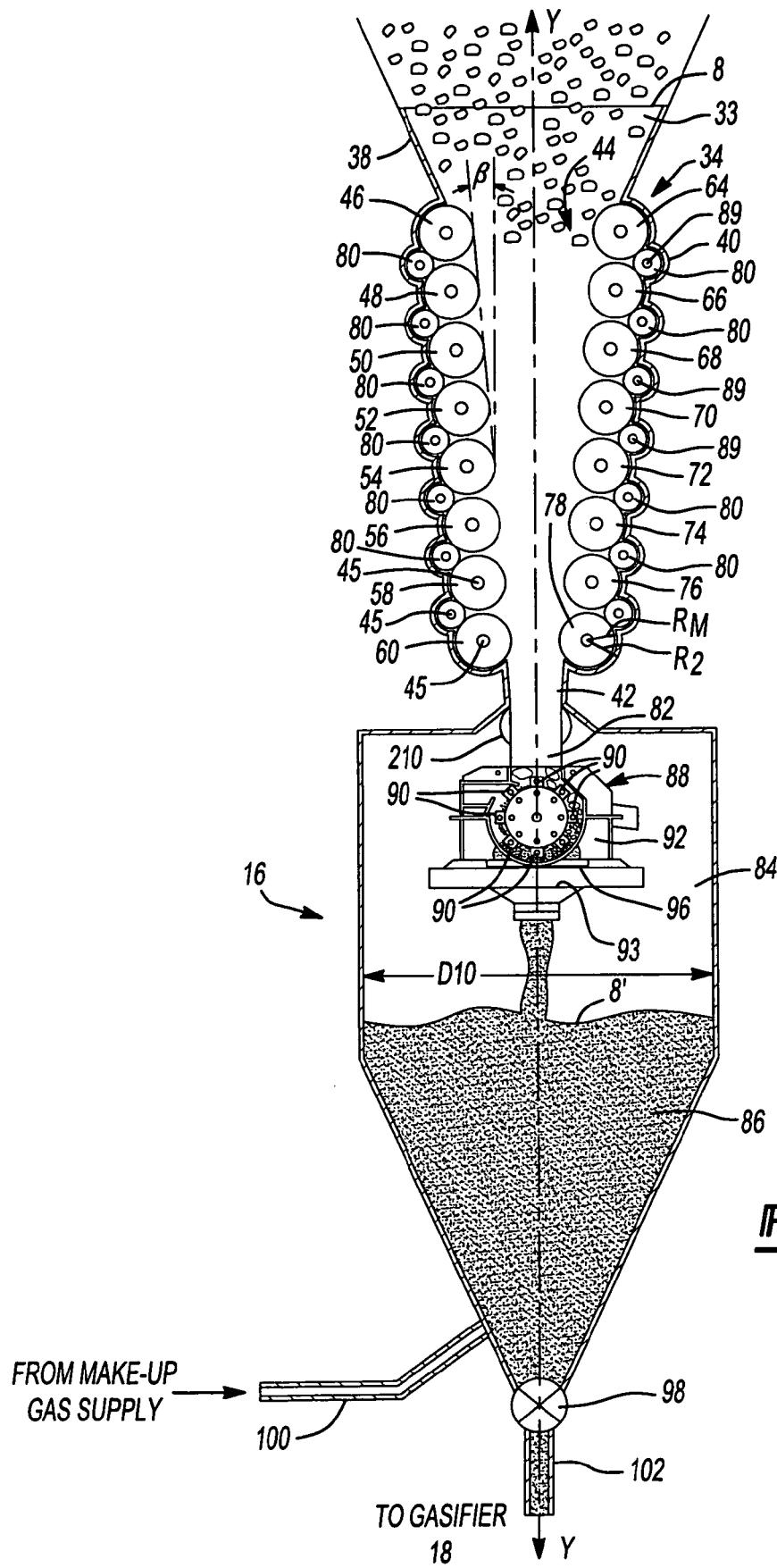
FIG. 2 is a cross sectional view of the high pressure dry coal slurry extrusion pump of various embodiments taken along line 2-2 of FIG. 1.
Figure 3:
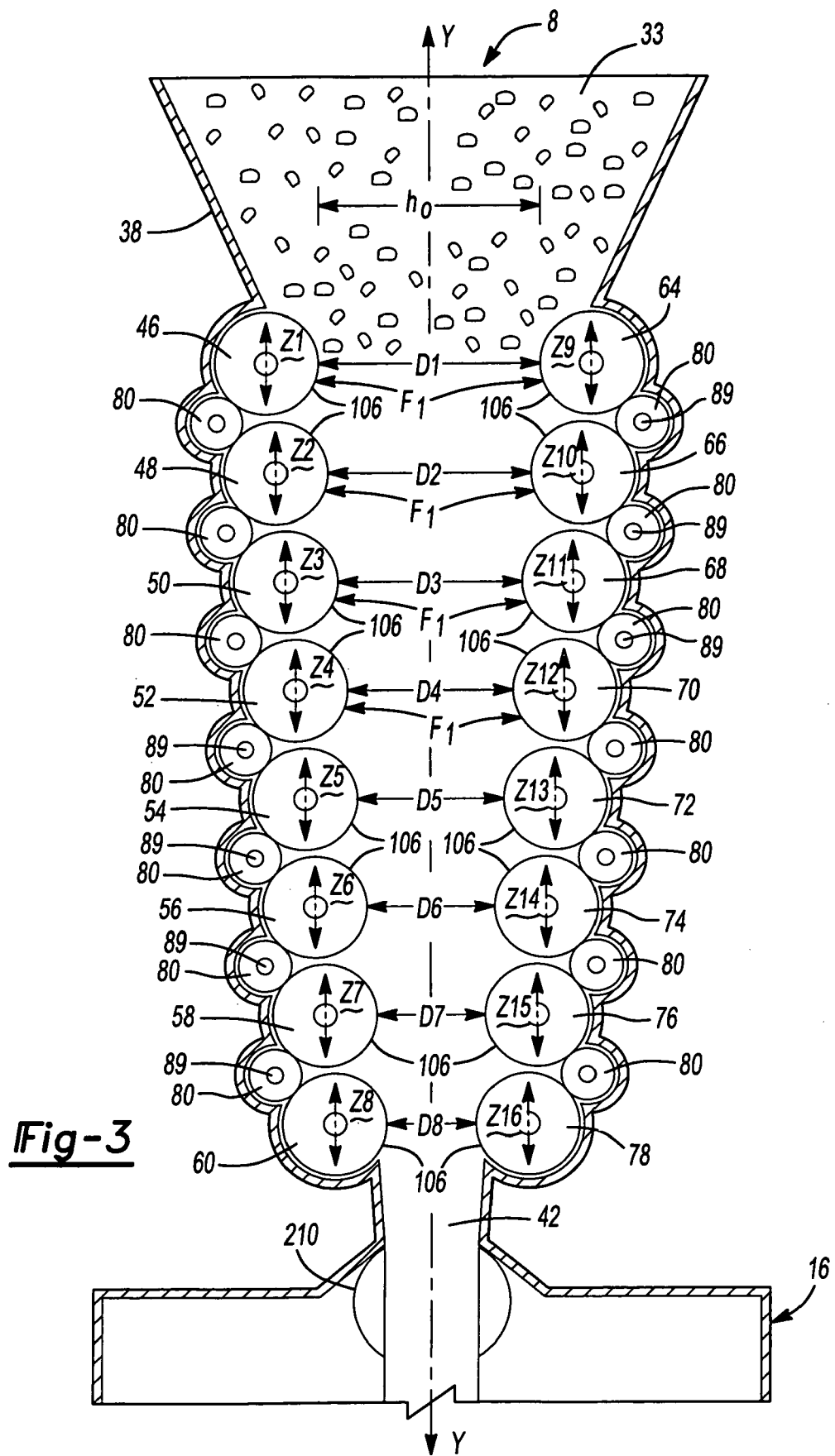
FIG. 3 is detailed cross sectional view of the high pressure dry coal slurry extrusion pump of one of the various embodiments.

With continuing reference to FIG. 1, and additional reference to FIGS. 2 and 3, the extruder pump 14 includes an inlet 33 fluidly coupled to the outlet 32 of the storage vessel 12. The extruder pump 14 may further include a housing 34 configured to enclose a roller system 36.

The housing 34 may be comprised of any suitable material which can withstand high pressure forces, such as metals and polymers. The housing 34 is generally configured to encompass the roller system 36, and may include a conical-to-rectangular transition section 38 that forms the inlet 33. The transition section 38 is generally adjacent to a plurality of curved surfaces 40, to facilitate the gravity flow of the raw fuel 8 from the inlet 33 to the roller system 36. The curved surfaces 40 are configured to conform to the shape of the roller system 36, and thus may be of varying sizes and shapes. Additionally, depending upon the configuration of the roller system 36, the housing 34 may be symmetric with respect to a vertical plane containing the Y-axis (i.e., the Y-axis vertical plane), as will be discussed in greater detail below. The housing 34 may further include outlet 42 to enable the high pressure raw fuel 8' to exit the extruder pump 14. The outlet 42 is generally formed adjacent to the roller system 36.

The roller system 36 includes a plurality of motive rollers 44 disposed adjacent to the inlet 33. The plurality of motive rollers 44 are generally disposed perpendicular to the Y-axis and symmetric to the Y-axis vertical plane, and each have a radius $r_m$ which is typically slightly smaller than a radius R2 of the curved surfaces 40 of the housing 34 to ensure a non-touching but close fit and to prevent the accumulation of raw fuel behind the motive rollers 44. Generally, the radius $r_m$ of each of the motive rollers 44 is approximately equivalent in size, however, the radius $r_m$ of each of the motive rollers 44 may be varied if desired. Typically, the radii $r_m$ of the motive rollers 44 is approximately three inches (76.2 mm), however other sizes of motive rollers 44 may be employed in the extruder pump 14. The plurality of motive rollers 44 may be comprised of any material which is suitable to crush or impart a substantial force onto the raw fuel, such as hardened steel or other alloys. In addition, each of the plurality of motive rollers 44 may include a bearing assembly (not specifically shown) capable of counteracting lateral forces F1 imparted onto each of the plurality of motive rollers 44 by the raw fuel 8. Typically, the motive rollers 44 may also include a labyrinth seal (not specifically shown) at each end to prevent the loss of gas and solid particles from the extruder pump 14.

The motive rollers 44 rotate about shafts 45. The shaft 45 may lie in a plane which is perpendicular to the Y-axis vertical plane. The tip speed of each motive roller, $v_m$, may be identical or different from the other rollers and may vary between about one and twenty feet per second (ft/s) (between about 30.5 centimeter/s (cm/s) and 6.09 meter/s(m/s)). The motive roller tip speed $v_m$ is equal to radius $r_m$, of each of the plurality of motive rollers 44 times the angular speed of each motive roller, $\omega_m$, according to: $v_m = r_m \omega_m$.

Each shaft 45 of the motive rollers 44 may lie in different planes Z. Generally, the planes Z are each offset a distance D from each other plane Z, however, alternative configurations could be employed depending upon the desired final pressure of the raw fuel 8', as will be described in greater detail below. Typically, the plurality of motive rollers 44 make a half angle, $\beta$, to the Y-axis vertical plane. The half angle $\beta$ may range between zero and about fifteen degrees depending upon the desired extruder pump 14, as will be described in greater detail below. Each of the plurality of motive rollers 44 are generally spaced with a gap of approximately 0.001 inch to 0.004 inch (0.025 millimeter to 0.10 millimeter) between each other.

For example, a first motive roller 46 may be positioned in a first plane Z1, and a second motive roller 48 may be disposed in a second plane Z2 adjacent to the first motive roller 46. A third motive roller 50 may be positioned in a third plane Z3 adjacent to the second motive roller 48 and a fourth motive roller 52 disposed in a fourth plane Z4. A fifth motive roller 54 may be positioned in a fifth plane Z5 and adjacent to the fourth motive roller 52. The fifth motive roller 54 may be adjacent a sixth motive roller 56. The sixth motive roller 56 may be disposed in a sixth plane Z6. A seventh motive roller 58 is generally disposed adjacent to the sixth motive roller 56, in a plane Z7. The seventh motive roller 58 may be adjacent an eighth motive roller 60. The eighth motive roller 60 is generally in a plane Z8 and may also be adjacent to the outlet and the outlet 42.

A ninth motive roller 64 may be disposed in a ninth plane Z9, opposite the first motive roller 46, along an X-axis. A tenth motive roller 66 may be positioned in a tenth plane Z10, opposite the second motive roller 48, and adjacent to the ninth motive roller 64. The tenth motive roller 66 may also be adjacent to an eleventh motive roller 68. The eleventh motive roller 68 may be disposed opposite to the third motive roller 50, in an eleventh plane Z11. A twelfth motive roller 70 may be positioned in a twelfth plane Z12, adjacent to the eleventh motive roller 68 and opposite the fourth motive roller 52. A thirteenth motive roller 72 may be disposed adjacent to the twelfth motive roller 70, opposite the fifth motive roller 54, in a thirteenth plane Z13.

The thirteenth motive roller 72 may also be adjacent to a fourteenth motive roller 74. The fourteenth motive roller 74 may be disposed opposite to the sixth motive roller 56, in a fourteenth plane Z14. A fifteenth motive roller 76 may be positioned in a fifteenth plane Z15, adjacent to the fourteenth motive roller 74 and opposite the seventh motive roller 58. The fifteenth motive roller 76 may also be adjacent to a sixteenth motive roller 78. The sixteenth motive roller 78 may be disposed opposite to the eight motive roller 60, in a sixteenth plane Z16, and may be adjacent to the outlet 42 of the extruder pump 14. It will be understood that although the roller system 36 is described herein as comprising eight motive rollers 44 per side, various other motive roller 44 configurations could be employed depending upon the desired length of the extruder pump 14, and upon the desired high pressure of the raw fuel 8'.

Typically, the motive rollers 44 form a rectangular nozzle to facilitate the pressurization of the raw fuel. Specifically, the distance D1 between the first plane Z1 and ninth plane Z9 is usually greater than a distance D2 between the second plane Z2 and tenth plane Z10. Accordingly, the distance D3 between the third plane Z3 and eleventh plane Z11 is usually less than the distance D2, but greater than a distance D4 between the fourth plane Z4 and twelfth plane Z12. Further, the distance D4 is usually greater than a distance D5 between the fifth plane Z5 and thirteenth plane Z13, but distance D5 is usually greater than a distance D6 between the sixth plane Z6 and fourteenth plane Z14. Likewise, the distance D6 is usually greater than a distance D7 between the seventh plane Z7 and the fifteenth plane Z15, but distance D7 is greater than a distance D8 between the eighth plane Z8 and sixteenth plane Z16. Thus, the distances D1 through D8 generally decrease from the inlet 33 to the outlet 42 (as indicated by angle β) to assist in building the pressure in the raw fuel, as will be discussed in greater detail below.

The roller system 36 may further include a plurality of sealing and pulverizing rollers 80 adjacent to each of the plurality of motive rollers 44. The pulverizing rollers 80 may each rotate about a shaft 89. Generally, the pulverizing rollers 80 are each adjacent to the plurality of motive rollers 44 and may be rotatably coupled to the plurality of motive rollers 44 with no gap between them. If there is no gap between pulverizing rollers 80 and motive rollers 44, then all motive rollers 44 must turn at the same tip speed, $v_m$. The pulverizing rollers 80 serve to crush the raw fuel by imparting additional forces on any raw fuel which may enter the area between the plurality of motive rollers 44 and the housing 34. The pulverizing rollers 80 may also comprise an appropriate seal at each end of the pulverizing roller 80, such as a labyrinth seal, to prevent gas leakage out of the housing 34.

Typically, the number of pulverizing rollers 80 is one less than the number of motive rollers 44 disposed on either side of the Y-axis vertical plane. Hence, in the one of the various embodiments illustrated, there are seven pulverizing rollers 80 per side of the Y-axis vertical plane, with one pulverizing roller 80 disposed between the first motive roller 46 and second motive roller 48, the second motive roller 48 and the third motive roller 50, the third motive roller 50 and the fourth motive roller 52, the fourth motive roller 52 and the fifth motive roller 54, the fifth motive roller 54 and the sixth motive roller 56, the sixth motive roller 56 and the seventh motive roller 58, and between the seventh motive roller 58 and the eighth motive roller 60. Generally, pulverizing rollers 80 are not positioned adjacent to either the inlet 33 or outlet 42, however, in some instances it may be desirable to include pulverizing rollers 80 at the inlet 33 and outlet 42.

The outlet 42 of the extruder pump 14 is generally fluidly coupled to an inlet 82 of the discharge tank 16. Additionally, a high pressure isolation valve (not shown) may also be located between the outlet 42 of the extruder pump 14 and the inlet 82 of the discharge tank 16. Generally, this high pressure isolation valve may be a specially designed horizontal "slide valve" (not shown) or a rotating cylinder valve 210 (i.e., a cylinder that contains a rectangular hole) to close the inlet 82 of the discharge tank 16. Under normal operation, the high pressure raw fuel 8' disposed in-between the plurality of motive rollers 44 which make up the extruder pump 14 can act as a high pressure seal between the extruder pump 14 and the discharge tank 16. The isolation valve 210 serves to enable initial extrusion pump solids priming, and provides safety against detrimental blow back whenever solids priming is lost. More particularly, extruder pump 14 must be initially primed with pulverized solids by operating the motive rollers 44 with the isolation valve 210 closed. This priming produces the solids pressure (normal to the motive roller surfaces), $P_{s,n}$, that is required for preventing detrimental blow back once the isolation valve 210 is opened exposing the extruder pump 14 to the high downstream gas pressure within the discharge tank 16, as will be discussed in greater detail below.

The discharge tank 16 may be operable to receive the raw fuel at a high pressure, and thus may be comprised of any material capable of withstanding a high pressure, such as steel or other suitable metallic compositions. Typically, the discharge tank 16 is capable of retaining raw fuel which is pressurized to approximately 1,300 pounds per square inch absolute (psia) (8,963 kilopascal(kPA)). The discharge tank 16 may be cylindrical in shape, and may have a diameter D10 greater than two feet. It is possible that other shapes may be implemented. The discharge tank 16 typically includes a top section 84 coupled to a conical end section 86. The conical end section 86 may generally be designed to have an included angle of thirty degrees or less as noted in U.S. Pat. No. 4,191,500, incorporated by reference herein in its entirety. The top section 84 is coupled to the outlet 42 of the extruder pump 14 and may include a hammer mill 88 or other suitable mechanical solids breaker.

The hammer mill 88 may be coupled to the inlet 82 to assist in restoring a void volume of the high pressure raw fuel 8', as will be described in greater detail below. The hammer mill 88 may include a plurality of members 90 disposed within an annular housing 92 and coupled to a central rotating shaft 94. The size of the annular housing 92 is such to provide a small amount of clearance for the members 90 such that as the members 90 rotate about the central rotating shaft 94, the members 90 contact and break any sintered high pressure fuel 8' which enters the hammer mill 88 from the outlet 42 of the extruder pump 14. A mesh screen 96 may be positioned over an opening 93 of the annular housing 92 to facilitate the entrance of only a pre-determined particle size of the raw fuel 8 into the discharge tank 16. The mesh screen 96 is desirable as the extruder pump 14 may cause the high pressure raw fuel 8' particles to sinter together to create overly large particles. In addition, the hammer mill 88 operates to restore the original void volume of the high pressure raw fuel 8, as will be discussed in greater detail below.

After the raw fuel exits the mesh screen 96, the high pressure raw fuel 8' may enter either the top section 84 or the conical end section 86 of the high pressure discharge tank 16 depending upon the quantity of raw fuel 8' already disposed in the discharge tank 16. The conical end section 86 includes a ball valve 98 and a gas make-up line 100. The ball valve 98 enables the high pressure raw fuel 8' to enter an inlet feedline 104 of the gasifier 18. According to one of the various embodiments, an interior diameter D2 of the ball valve 98 may be approximately four inches (101.6 mm).

The gas make-up line 100 typically provides an inert gas to the conical end section 86 of the discharge tank 16 to fill the void volume of the high pressure raw fuel 8'. In particular, as the high pressure raw fuel 8' exits the extruder pump 14 and hammer mill or breaker 88, the void volume of the high pressure raw fuel 8' must be filled with high pressure gas as the original low pressure gas is compressed. This extra gas is delivered to the discharge tank 16 near its exit end to ensure that the solids void fraction above ball valve 98 is near the original static bed void fraction of the pulverized solid in storage vessel 12. Generally, gases such as carbon dioxide (when not in the sub-cooled incompressible liquid state), nitrogen, hydrogen and carbon monoxide may be used as the transport make-up gas.

When opened, the ball valve 98 of the discharge tank 16 enables the high pressure raw fuel 8' to flow from an outlet 102 of the discharge tank 16 into the inlet feedline 104 of the gasifier 18. The gasifier 18 is operable to gasify the high pressure raw fuel 8' to create a desirable gaseous medium which can be cleaned of ash material together with sulfur and ammonia contaminates for further use in the petrochemical or power industries. For example, this cleaned gas can be subsequently burned in air prior to delivery to an aero-derivative gas turbine for electrical power generation.

In order to determine the appropriate length L for the extruder pump 14 and thus the number of motive rollers 44 required, the following procedure may be employed. The procedure described herein is derived from the publication "Dense-Phase Feeding of Pulverized Coal," AIChE Journal, 29, 1000 (1983) and AIChE Journal, 32, 1055 (1986) co-authored by Spouse K. M. and Schuman, M. D., the text of which is incorporated herein in its entirety. In order to determine the appropriate length L of the extruder pump 14, first the solids mass flow rate through the extruder pump 14 should be calculated. The solids mass flow rate, $\dot{m}_s$, is given by:

$$\frac{\dot{m}_S}{A_O} = v_m(1-\varepsilon_O)\rho_S\cos\beta \tag{1}$$

where the variable $A_o$ is the cross-sectional flow area of the inlet 33 of the extruder pump 14, the variable $\varepsilon_o$ is the initial static bed void fraction of the raw fuel 8 upstream of the extruder pump 14, and the variable $\rho_s$ is the true solids non-void density.

Next, the amount of bed compression, $(\varepsilon_o-\varepsilon)/\varepsilon_o$, at the exit of the extruder pump 14 may be calculated as:

$$\frac{\varepsilon_O - \varepsilon}{\varepsilon_O} = \frac{75\mu\kappa\dot{m}_S P_g^*}{\rho_S D_p^2 w \sin\delta_S \cos\beta} \tag{2}$$

where the variable $\varepsilon$ is the void fraction of the high pressure raw fuel 8' exiting the extruder pump 14, the variable $\mu$ is the dynamic viscosity of the gas within the interstices of the coal particle, the variable w is the width of the extruder pump 14 (or length of the individual rollers), the variable $D_p$ is the mean solid particle diameter of the raw fuel, the variable $\delta_w$ is the effective angle of friction between the solids and a surface 106 of each of the plurality of motive rollers 44, the variable $P_g^*$ is the non-dimensional gas pressure at the outlet 42 of the extruder pump 14, and the variable $\kappa$ is the compressibility factor of the solids bed under a confined space shear.

The non-dimensional gas pressure, $P_g^*$, at the outlet 42 of the extruder pump 14 may be defined as:

$$P_g^* = 1 - \frac{P_g^O}{P_g} \tag{3}$$

where the variable $P_g^o$ is the inlet or ambient gas pressure in the inlet 33 of the extruder pump 14 and the variable $P_g$ is simply the gas pressure at the outlet 42 of the extruder pump 14 (which is identical to the gas pressure within the discharge tank 16). It is to be noted that the gas pressure, $P_g^*$, at the outlet 42 of the extruder pump 14 can range from zero (for an extruder pump 14 with essentially no length L where $P_g$ equals $P_g^o$) to 1.0 (for an extruder pump 14 having an extremely high discharge gas pressure at the outlet 42 of the extruder pump 14 where $P_g \gg P_g^o$).

Next, the solids compressibility factor under a confined space shear, $\kappa$, may be calculated as:

$$\kappa \equiv \frac{(\varepsilon_O - \varepsilon)}{\varepsilon_O P_{S,n}} \tag{4}$$

Where the variable $P_{S,n}$ is the solids pressure normal to the surface 106 of each of the plurality of motive rollers 44. The confined space shear compressibility factor, $\kappa$, is not only a function of the initial static bed void fraction, $\varepsilon_o$, of the raw fuel as seen in Equation 4 but it is also a function of the solids mean particle diameter, $D_p$. Hence, $\kappa$ is usually represented as $f(\varepsilon_o, D_p)$.

The length, L, of the extruder pump 14 may then be given by the following equation:

$$\frac{L}{h_O} = \frac{1}{2\tan\beta} \tag{5}$$

$$\left[1-\exp\left\{\frac{-\varepsilon_O^2 P_g^O D_p^2 w\rho_S \tan\beta}{75\mu\dot{m}_S(1-\varepsilon_O)}\left[6.91 + \frac{\varepsilon_O P_g^*}{(1-\varepsilon_O P_g^*)} - \ln(1-\varepsilon_O P_g^*)\right]\right\}\right]$$

Where the variable $h_o$ is the initial separation distance between each of the plurality of motive rollers 44 (FIG. 1) and is simply equal to the ratio of $A_o/w$.

Equation 5 can be greatly simplified if the extruder pump 14 is designed to have the half angles $\beta$ between each of the plurality of motive rollers 44 are near zero degrees. In this case Equation 5 becomes:

$$\frac{L}{h_O} = \frac{\varepsilon_O^2 P_g^O D_p^2 w \rho_S}{150\mu\dot{m}_S(1-\varepsilon_O)}\left[6.91 + \frac{\varepsilon_O P_g^*}{(1-\varepsilon_O P_g^*)} - \ln(1-\varepsilon_O P_g^*)\right] \tag{6}$$

Example

As an example of the various embodiments, consider the storage vessel 12 as containing coal to feed into the extruder pump 14. The coal may be assumed to have the following parameters:

| | |
|---|---|
| True Solids Density, $\rho_s$ | 87.0 lb/ft³ (1,393 kg/m³) |
| Initial Static Bed Void Fraction, $\epsilon_o$ | 0.570 |
| Solids/Wall Friction Angle, $\delta_w$ | 15 degrees |
| Solids Compressibility Factor, $\kappa$ | 3.28 × 10⁻³ inches squared per pound force (in²/lbf) or 0.477 inverse mega-Pascals (MPa⁻¹) |
| Mean Solids Particle Diameter, $D_p$ | 28 micrometers (μm) (1.1 × 10⁻³ inches) |

In this example, the coal may be transported using carbon dioxide gas having a dynamic viscosity within the upstream static bed of 0.0144 centipoises (ambient temperature and pressure state conditions of 80 degrees F. and 1 atmosphere) (0.0144 millipascal second).

From Equation 1, it can be shown that an extruder pump 14 having the plurality of motive rollers 44 with a total length w of 1.86 feet (ft) (0.567 meter (m)), an initial separation distance $h_o$ (D1) of 0.5 ft (0.1524 m) between the plurality of motive rollers 44, a motive roller half angle β of five degrees and a motive roller tip speed $v_m$ of 2 ft/sec (0.6096 m/s) will pump a pulverized coal flow rate $\dot{m}_s$ of approximately 3,000 tons/day (31.5 kg/s). If the radius of each of the plurality of motive rollers 44 is 1.5 inches (0.0381 m), the rotation speed $\omega_m$ of each of the plurality of motive rollers 44 is approximately 153 revolutions per minute (rpm) (2.55 Hertz (Hz)).

For example, if the pressure of the gas at the outlet 42 of the extruder pump 14 is desired to be approximately 1,300 psia (8,963 kPa), Equations 2 and 3 can be used to calculate the solids bed void fraction, $\epsilon$, at the outlet 42 of the extruder pump 14 which will have been reduced by approximately ten percent from the initial 0.570 to 0.513. Equation 4 shows that the solids pressure, $P_{s,n}$, exerted on the surface 106 of each of the motive rollers 44 will be approximately 30.5 psi (210 kPa) in this example being studied. The solids pressure $P_{s,n}$ will produce the force F1 on each of the plurality of motive rollers 44 of approximately 2,040 pound-force (lbf) (9,074 Newtons (N)). This force F1 is counteracted by the two bearing assemblies, such as ball bearings, on each of the plurality of motive rollers 44 (not specifically shown).

Finally, the length L of the extruder pump 14 can be determined by Equation 5 to be approximately 1.91 ft (58 cm). Since the plurality of motive rollers 44 in this example of one of the various embodiments each have a diameter of three inches (7.62 cm) as noted above, this will require eight motive rollers on each side of the Y-axis vertical plane. In addition, it should be noted that if the motive roller half angle β is set to zero degrees, the total extrusion length L would need to be increased to 3.15 ft (96 cm) according to Equation 6 (thus requiring approximately twelve motive rollers 44 on each side of the Y-axis vertical plane).

As the high pressure raw fuel 8' enters the discharge tank 16, the raw fuel 8' will contain the gaseous fluid initially trapped within the interstices of the coal particles prior to entry into the extruder pump 14. The gaseous fluid trapped within the interstices of the high pressure raw fuel 8', is compressed to a smaller volume as it enters the high pressure tank 16. Hence, additional high pressure gas is required to be added to the coal stream to fill the interstical volumes vacated by the original compressing gas. Thus, the gas make-up line 100 may be used to deliver this additional high pressure gas for filling the interstices of the high pressure raw fuel 8'. The gaseous flow rate of gaseous transport fluid trapped within the interstices of the raw fuel 8 through the extrusion process, $\dot{m}_{g,ex}$, can be related to the solids flow rate by the following equation:

$$\dot{m}_{g,ex} = \frac{\epsilon_O \rho_g^O \dot{m}_S}{(1-\epsilon_O)\rho_S} \qquad (7)$$

where the variable $\rho_g^\circ$ is the density of the transport gas upstream of the extruder pump 14 at ambient conditions. For most gases, this density can usually be determined by the perfect gas equation, with the exception of carbon dioxide gas.

As the pressurized raw fuel exits the outlet 42 of the extruder pump 14, the raw fuel enters the discharge tank 16 through the inlet 82. Next, the high pressure raw fuel 8' enters the hammer mill 88. The hammer mill 88 then acts to return the void fraction of the high pressure raw fuel 8' back to the initial static bed void fraction $\epsilon_o$ of the raw fuel 8 at the inlet 33 to the extruder pump 14. Due to the high pressure in the discharge tank 16, additional make-up gas must be introduced through the gas make-up line 100 as noted above in order to re-fill the void volume in the interstices of the raw fuel. Generally, the flow rate of make-up gas, $\dot{m}_{g,mk}$, into the discharge tank 16 may be found from the following equation:

$$\dot{m}_{g,mk} = \frac{\epsilon_O \dot{m}_S (\rho_g - \rho_g^O)}{(1-\epsilon_O)\rho_S} \qquad (8)$$

where the variable $\rho_g$ is the density of the make-up gas inside the discharge tank 16. The density of the make-up gas $\rho_g$ may be estimated by the perfect gas equation of state with the exception of a few gases such as carbon dioxide.

For the example given above, according to various embodiments, carbon dioxide ($CO_2$) gas may be used as the transport gas. Using $CO_2$ gas, Equation 7 may be used to calculate the flow rate of $CO_2$ gas into the discharge tank 16 from the extruder pump 14, $\dot{m}_{g,ex}$, as 0.0766 pound per sec (lb/sec) (0.0347 kilograms per second (kg/s)). The flow rate of the $CO_2$ transport gas into the discharge tank 16, $\dot{m}_{g,mk}$, may in turn be found from Equation 8 as 52.8 lb/sec (24 kg/s) where the $CO_2$ density at 1,300 psia (8,963 kPa) and 80° F. is known to be approximately 50.0 pound per feet cubed (lb/ft³) (800 kilogram per cubic meter (kg/m³) (as compared to the 6.28 lbm/ft³ (100 kg/m³) value one would calculate from the perfect gas equation).

Alternatively, the transport gas flow rate into the discharge tank 16 can be significantly reduced by using heated gas in this location. If, for example, heated $CO_2$ transport gas is used (so that the slurry exiting the outlet 102 of the discharge tank 16 is at 195° F.); then Equation 8 shows that the $CO_2$ transport gas flow rate, $\dot{m}_{g,mk}$, can be reduced to approximately 10.9 lb/sec (4.94 kg/s) (an 80 percent reduction). This reduction is directly due to the lower $CO_2$ transport gas density of 10.4 lb/ft³ (166.6 kg/m³) (at 195° F. and 1,300 psia (8,963 kPa)).

After the desired length L of the extruder pump 14 has been calculated, the extruder pump 14 may be assembled and coupled to the storage vessel 12 and discharge tank 16. Then, the pre-selected raw fuel 8 can be placed into the storage vessel 12. The force of gravity will cause the raw fuel 8 to exit the storage vessel 12 through the outlet 32 and flow into the inlet 33 of the extruder pump 14. According to one of the various embodiments, the first and ninth motive rollers 46, 64 may initially encounter the raw fuel 8, and impart a first force F2 onto the raw fuel 8. Next, the second and tenth motive rollers 48, 66 may impart a second force F3 onto the raw fuel 8. A third force F4 may then be imparted onto the raw fuel by the third and eleventh rollers 50, 68, and a fourth force F5 may be imparted by the fourth and twelfth motive rollers 52, 70. The raw fuel 8 then passes to the fifth and thirteenth motive rollers 54, 72 where a fifth force F6 may be imparted onto the raw fuel 8. A sixth force F7 may be applied to the raw fuel 8 by the sixth and fourteenth motive rollers 56, 74. The raw fuel 8 may then engage the seventh and fifteenth motive rollers 58, 76 for receipt of a seventh force F8 prior to engaging the eight and sixteenth motive rollers 60, 78 for receipt of an eight force F9. The first, second, third, fourth, fifth, sixth, seventh and eighth forces F2, F3, F4, F5, F6, F7, F8, F9 serve to pressurize the raw fuel 8 into a pre-determined high pressure. The raw fuel 8 may also encounter the plurality of pulverizing rollers 80, however, it will be understood that the pulverizing rollers 80 are an optional feature of the extruder pump 14.

After the raw fuel 8 has been pressurized to the pre-determined amount, the pressurized raw fuel 8' may enter the inlet 82 of the discharge tank 16 from the outlet 42 of the extruder pump 14. Then, the high pressure raw fuel 8' may enter the hammer mill 88. The hammer mill 88 serves to restore the void volume of the raw fuel 8' to the void volume which existed prior to the raw fuel 8 entering the extruder pump 14. The raw fuel 8' may then exit the hammer mill 88 through the mesh screen 96 and enter the top section 84 or conical end section 86 of the discharge tank 16. Once in the top or conical end section 84, 86 the make-up gas from the gas make-up line 100 may be used to fill the interstices of the high pressure raw fuel 8' to enable the raw fuel 8' to be fed into the gasifier 18. Thus, once the ball valve 98 is opened, the raw fuel 8' may be fed into the gasifier 18 for combustion.

Thus, the present invention provides a more efficient, less complex method for pressurizing a raw fuel. Specifically, the use of the roller system 36 in the extruder pump 14 serves to pressurize the raw fuel 8 without the use of complex heat exchangers or other extraneous components. The use of the extruder pump 14 further increases the efficiency of the gasification system 10 by reducing the amount of slurry fluid required to flow the raw fuel 8 into the gasifier 18.

While various preferred embodiments have been described, those skilled in the art will recognize modifications or variations which might be made without departing from the inventive concept. The examples illustrate the invention and are not intended to limit it. Therefore, the description and claims should be interpreted liberally with only such limitation as is necessary in view of the pertinent prior art.

What is claimed is:

1. A system for pressurizing a raw fuel used in a pressure reactor, comprising:
   a vessel operable to receive the raw fuel;
   an extruder pump fluidly coupled to the vessel, the extruder pump including a housing having an inlet for receiving the raw fuel from the vessel, an outlet for discharging pressurized raw fuel, and a plurality of motive rollers mounted for rotation within the housing for successively pressurizing the raw fuel from the vessel;
   a plurality of seals between the plurality of motive rollers and the housing, the plurality of seals being configured to limit leakage from the housing; and
   a discharge tank fluidly coupled to the extruder pump for receiving pressurized raw fuel from the extruder pump.

2. The system of claim 1, wherein the plurality of motive rollers are mounted in the extruder pump to form an angle to a vertical plane.

3. The system of claim 2, wherein the angle of the plurality of motive rollers ranges between zero and fifteen degrees.

4. The system of claim 1 wherein the plurality of motive rollers includes a first row of motive rollers located on one side of the extruder pump and second row of motive rollers on another side of the extruder pump spaced apart from the first row of motive rollers.

5. The system of claim 1, wherein the discharge tank further comprises: at least one mechanism capable of restoring a void fraction of the raw fuel to a void fraction of the raw fuel prior to entry into the inlet; and at least one source of pressurized gas operable to create a slurry from the raw fuel at the high pressure.

6. The system of claim 1, wherein the raw fuel is selected from the group comprising: coal, petcoke, and combinations thereof.

7. The system of claim 1, wherein the housing includes curved surfaces that conform to the plurality of motive rollers.

8. The system of claim 1, wherein the housing having includes a first curved surface portion of a first radius of curvature and a second curved surface portion of a second radius of curvature that is smaller than the first radius of curvature.

9. The system of claim 1, wherein the extruder pump further comprises a plurality of auxiliary rollers adjacent the plurality of motive rollers, each of the plurality of auxiliary rollers being smaller in size than each of the plurality of motive rollers.

10. The system of claim 9, wherein the extruder pump includes less of the plurality of auxiliary rollers than of the plurality of motive rollers.

11. The system of claim 9, wherein each of the plurality of auxiliary rollers is in contact with two of the plurality of motive rollers.

12. The system of claim 1, wherein the plurality of seals includes labyrinth seals located at ends of the plurality of motive rollers.

13. The system of claim 1, wherein the plurality of seals includes sealing rollers, and each sealing roller is directly rotatably coupled to two of the plurality of motive rollers, with no gap between the respective two motive rollers and the corresponding sealing roller.

14. A system for pressurizing a raw fuel used in a pressure reactor, comprising:
   a vessel operable to receive the raw fuel;
   an extruder pump fluidly coupled to the vessel, the extruder pump including a housing having an inlet for receiving the raw fuel from the vessel, an outlet for discharging pressurized raw fuel, and a plurality of motive rollers mounted for rotation within the housing, the plurality of motive rollers including a first row of motive rollers located on one side of the extruder pump and second row of motive rollers on another side of the extruder pump spaced apart from the first row of motive rollers for successively pressurizing the raw fuel from the vessel, and the plurality of motive rollers turn at different tip speeds such that the motive rollers near the inlet have tip speeds higher than those near the outlet; and
   a discharge tank fluidly coupled to the extruder pump for receiving pressurized raw fuel from the extruder pump.

15. A system for providing pressurized raw fuel to a pressure reactor, comprising:

a vessel having an inlet operable to receive the raw fuel and an outlet for discharging pressurized raw fuel;

a roller system within the vessel, the roller system operable to pressurize the raw fuel, the roller system including:

a first motive roller adjacent to the inlet, the first motive roller operable to pressurize the raw fuel to a first pressure fuel;

a second motive roller adjacent to the inlet and displaced a first distance across from the first motive roller, the second motive roller receiving the raw fuel of the first pressure level and further pressurizing the raw fuel to a second pressure level before directing the raw fuel toward the reactor; and a plurality of seals, with at least one of the plurality of seals arranged between the first motive roller and the vessel and another of the plurality of seals arranged between the second motive roller and the vessel to limit leakage from the vessel.

16. The system of claim 15, further comprising: a mesh screen disposed in the inlet, the mesh screen operable to enable raw fuel having a pre-determined particulate size to enter the roller system.

17. The system of claim 15, wherein the outlet further comprises: a chamber coupled to the outlet for receipt of the raw fuel, the chamber operable to retain the raw fuel at the high pressure.

18. The system of claim 17, wherein the chamber further comprises:
   at least one mechanism capable of restoring a void fraction of the raw fuel to a void fraction of the raw fuel prior to entry into the inlet; and
   at least one source of pressurized gas operable to create a slurry from the raw fuel at the high pressure.

19. The system of claim 15, wherein the roller system further comprises an auxiliary roller in contact with each of the first motive roller and the second motive roller, the auxiliary roller being smaller than each of the first motive roller and the second motive roller.

20. The system of claim 15, wherein the raw fuel is selected from the group comprising: coal, petcoke, and combinations thereof.

21. The system of claim 8, wherein the plurality of seals includes labyrinth seals located at ends of the plurality of motive rollers.

22. The system of claim 15, wherein the plurality of seals includes sealing rollers, and each sealing roller is directly rotatably coupled to two of the plurality of motive rollers, with no gap between the respective two motive rollers and the corresponding sealing roller.

23. A system for providing pressurized raw fuel to a pressure reactor, comprising:
   a vessel having an inlet operable to receive the raw fuel and an outlet for discharging pressurized raw fuel;
   a roller system within the vessel, the roller system operable to pressurize the raw fuel, the roller system including:
   a first motive roller adjacent to the inlet, the first motive roller operable to pressurize the raw fuel to a first pressure fuel;
   a second motive roller adjacent to the inlet and displaced a first distance across from the first motive roller, the second motive roller receiving the raw fuel of the first pressure level and further pressurizing the raw fuel to a second pressure level before directing the raw fuel toward the reactor, the first motive roller and the second motive roller turn at different tip speeds such that the first motive roller near the inlet has tip speeds higher than the second motive roller near the outlet.

24. A system for pressurizing a raw fuel, comprising:
   a vessel operable to receive the raw fuel;
   an extruder pump fluidly coupled to the vessel, the extruder pump operable to pressurize the raw fuel, the extruder pump further including:
   a housing symmetric to a vertical plane comprising an inlet for receipt of the raw fuel from the vessel and an outlet fluidly coupled to the discharge tank to provide the discharge tank with the pressurized raw fuel;
   a plurality of motive rollers disposed within the housing, the plurality of motive rollers arranged in the housing to form an angle to the vertical plane;
   a plurality of seals between the plurality of motive rollers and the housing, the plurality of seals being configured to limit leakage from the housing;
   a discharge tank fluidly coupled to the extruder pump and operable to receive the pressurized fluid from the extruder pump; and
   a gasifier coupled to the discharge tank, the gasifier operable to combust the pressurized raw fuel.

25. The system of claim 24, wherein the angle of the plurality of motive rollers ranges between zero and fifteen degrees.

26. The system of claim 24, wherein the plurality of motive rollers includes a first row of motive rollers located on one side of the extruder pump and second row of motive rollers on another side of the extruder pump spaced apart from the first row of motive rollers.

27. The system of claim 24 wherein the plurality of motive rollers turn at different tip speeds such that the motive rollers near the pump's inlet have tip speeds higher than those near the exit.

28. The system of claim 24, wherein the discharge tank further comprises:
   at least one mechanism capable of restoring a void fraction of the raw fuel to a void fraction of the raw fuel prior to entry into the inlet; and
   at least one source of pressurized gas operable to create a slurry from the raw fuel at the high pressure.

29. The system of claim 28 wherein the at least one mechanism capable of restoring a void fraction of the raw fuel to a void fraction of the raw fuel includes a ball valve 98 and a gas make-up line between the discharge tank and the least one source of pressurized gas.

* * * * *